H. K. HESS.
PROCESS OF TREATING TIMBER.
APPLICATION FILED OCT. 11, 1918.
1,344,891.
Patented June 29, 1920.
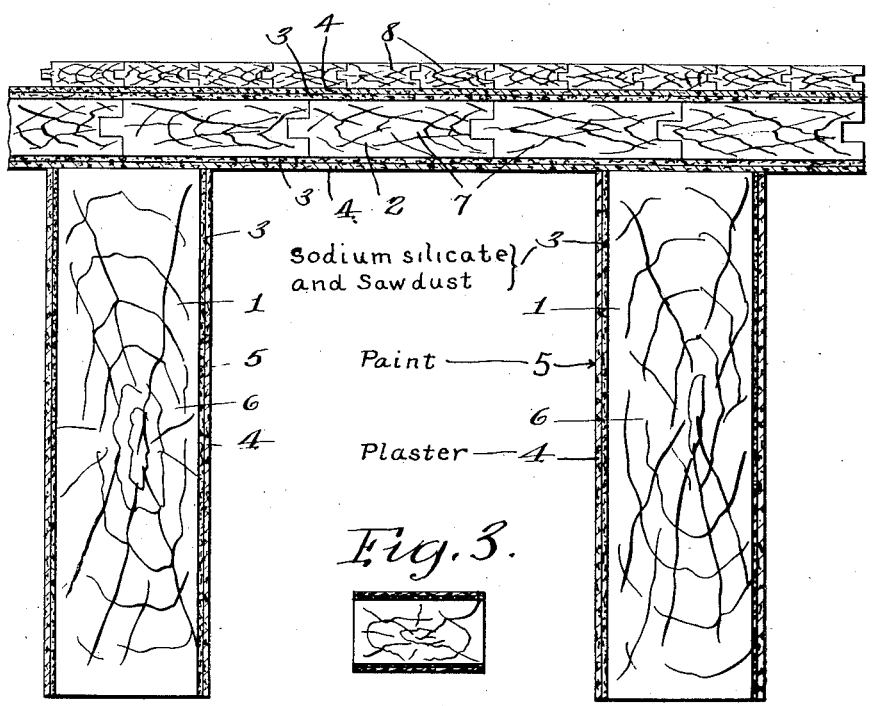
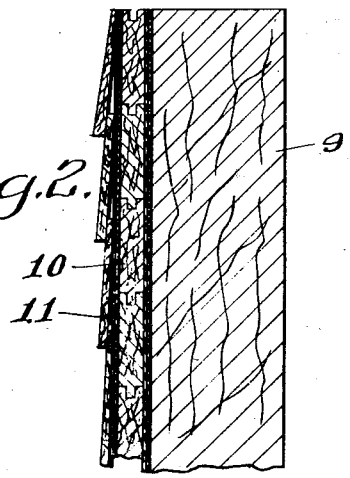
INVENTOR.
Henry K. Hess.
BY
Parsons & Birdsall
ATTORNEYS.

UNITED STATES PATENT OFFICE.

HENRY K. HESS, OF SYRACUSE, NEW YORK.

PROCESS OF TREATING TIMBER.

1,344,891.  Specification of Letters Patent.  Patented June 29, 1920.

Application filed October 11, 1918. Serial No. 257,786.

*To all whom it may concern:*

Be it known that I, HENRY K. HESS, a citizen of the United States, and a resident of Syracuse, in the county of Onondaga and State of New York, have invented a certain new and useful Process of Treating Timber, of which the following is a specification.

This invention has for its object a particularly simple economical and efficient process of treating wood and lumber to make the same fire proof and also capable of withstanding the elements when exposed, and it consists in the steps and in the novel features hereinafter set forth and claimed.

In describing this invention, reference is had to the accompanying drawings in which like characters designate corresponding parts in all the views.

Figure 1 is a fragmentary view of a building structure including joists and flooring supported thereby, the timbers of which are treated in accordance with my process.

Fig. 2 is a sectional view through studding, sheeting and clap boards, the studding and sheeting being treated in accordance with my process.

Fig. 3 is an end view of the studding.

This process consists in applying to the wood, a coat of fire proofing material as sodium silicate or water glass, applying thereto a protective coating of plastic material which hardens and is capable of receiving a water proofing paint, and applying paint to the plaster coating. However, the coat of paint may be omitted.

Usually, in order to give body to the fire proofing coating and to make the plaster adhere thereto, a coating of sawdust is applied in sufficient quantity to absorb the sodium silicate not taken up by the timber, the coating of silicate being sufficient to impregnate or saturate a layer of sawdust.

In other words, a layer not only of sodium silicate is applied to the timber but also in effect a layer of sawdust saturated or impregnated with sodium silicate is applied. The sodium silicate or water glass is preferably first applied to the lumber by dipping the lumber or by painting the water glass thereon; and while the water glass is wet the sawdust is spread on the wet surface and becomes impregnated with the sodium silicate. Thereafter, a plaster such as plaster of Paris or a gypsum plaster is applied and when set the water proofing paint as asphaltum or other paint is applied. In some cases, it is preferable to treat the sawdust with water glass before applying to the lumber, the surface of which is coated with water glass so that the sawdust is saturated with water glass and is thoroughly bound to the lumber.

One of the objects of the sawdust impregnated with water glass is to provide a rough surface to which the plaster will adhere or a binder between the wood and the plaster. The object of the plaster is to protect the water glass to increase the fire proofing, also to provide a surface which will receive a water proofing paint as asphaltum or oil paints, as it is not practical to apply paint directly to the surface impregnated with water glass for the reason that the water glass disintegrates the paint especially in the presence of moisture. The paint renders the plaster impervious to moisture.

In Fig. 1, 1 designates the joists and 2 the flooring of a structure, the joists being provided with a coating 3 of water glass and sawdust; 4 is the layer of plaster. 5 is the coating of paint.

These coats are applied to the sides of the studding. It is not necessary to apply it to the edges 6 which edges abut against other timbers.

7 designates a sub-floor to which are applied coats of water glass, sawdust, plaster and paint. 8 is the top of finishing flooring.

In Fig. 2, 9 designates studding; 10 the sheeting nailed to the studding and 11 clap boards, the studding having its opposite edges treated in accordance with my process as shown in Fig. 3 and the sheeting being treated on its inner and outer sides in accordance with my process.

What I claim is:

1. The process of treating lumber consisting in applying a coating of sodium silicate to the lumber, applying a coat of plaster capable of receiving a water proof paint, and then applying a coat of water proof paint.

2. The process of treating lumber consisting in applying a coat of sodium silicate to the lumber, applying a coating of plaster to receive water proof material and applying a water proofing material to the plaster.

3. The process of treating lumber consisting in applying a coat of sodium silicate and sawdust.

4. The process of treating lumber consisting in applying a coat of sodium silicate, applying to said coat a layer of sawdust sufficient to absorb the excess sodium silicate not absorbed into the lumber.

5. The process of treating lumber consisting in applying a coat of sodium silicate and sawdust and applying a protective coat of plaster on the coating of sawdust and sodium silicate.

6. The process of fire proofing lumber consisting in applying a coat of sodium silicate, applying to said coat a layer of sawdust sufficient to absorb the excess sodium silicate, applying a coating of plaster capable of receiving a coat of water proof paint, and applying water proof paint to the coating of plaster.

In testimony whereof, I have hereunto signed my name, at Syracuse, in the county of Onondaga, and State of New York, this 5th day of October, 1918.

HENRY K. HESS.